United States Patent [19]
Van Den Berg

[11] Patent Number: 6,131,267
[45] Date of Patent: Oct. 17, 2000

[54] METHOD OF MANUFACTURE OF AN ENCAPSULATED TRANSDUCER

[75] Inventor: Dave Van Den Berg, Minden, Nev.

[73] Assignee: Bently Nevada Corporation, Minden, Nev.

[21] Appl. No.: 09/102,487

[22] Filed: Jun. 22, 1998

Related U.S. Application Data

[62] Division of application No. 08/542,534, Oct. 13, 1995, Pat. No. 5,770,941.

[51] Int. Cl.⁷ ....................................................... G01R 3/00
[52] U.S. Cl. ...................... 29/595; 29/602.1; 264/272.15; 264/272.16; 264/278; 425/125; 425/577
[58] Field of Search .................... 264/272.16, 272.15, 264/278; 29/595, 602.1; 425/125, 577

[56] References Cited

U.S. PATENT DOCUMENTS

| | | |
|---|---|---|
| 2,361,348 | 10/1944 | Dickson et al. . |
| 2,890,505 | 6/1959 | Brand . |
| 3,473,110 | 10/1969 | Hardin et al. . |
| 3,521,158 | 7/1970 | Morrow et al. . |
| 3,932,828 | 1/1976 | Plunkett et al. . |
| 3,996,510 | 12/1976 | Guichard . |
| 4,000,877 | 1/1977 | Shead et al. . |
| 4,162,138 | 7/1979 | Byrne . |
| 4,377,548 | 3/1983 | Pierpont . |
| 4,408,159 | 10/1983 | Prox . |
| 4,419,646 | 12/1983 | Hermle . |
| 4,470,786 | 9/1984 | Sano et al. . |
| 4,564,810 | 1/1986 | Geithman et al. . |
| 4,680,543 | 7/1987 | Kohen . |
| 4,829,245 | 5/1989 | Echasseriau et al. . |
| 4,847,557 | 7/1989 | Saito et al. . |
| 4,849,728 | 7/1989 | Goll et al. . |
| 4,954,307 | 9/1990 | Yokoyama . |
| 4,959,000 | 9/1990 | Giza . |
| 5,016,343 | 5/1991 | Schutts . |
| 5,018,049 | 5/1991 | Mehnert . |
| 5,021,737 | 6/1991 | Schutts . |
| 5,036,285 | 7/1991 | Shaw . |
| 5,039,942 | 8/1991 | Buchschmid et al. . |
| 5,049,055 | 9/1991 | Yokoyama . |
| 5,122,046 | 6/1992 | Lavallee et al. . |
| 5,133,921 | 7/1992 | Yokoyama . |
| 5,138,292 | 8/1992 | Forster . |
| 5,147,657 | 9/1992 | Giza . |
| 5,151,277 | 9/1992 | Bernardon et al. . |
| 5,182,032 | 1/1993 | Dickie et al. . |
| 5,226,221 | 7/1993 | Kilgore . |
| 5,240,397 | 8/1993 | Fay et al. . |
| 5,252,051 | 10/1993 | Miyamoto et al. . |
| 5,278,496 | 1/1994 | Dickmeyer et al. . |
| 5,351,388 | 10/1994 | Van Den Berg et al. . |
| 5,376,325 | 12/1994 | Ormson . |
| 5,381,089 | 1/1995 | Dickmeyer et al. . |
| 5,418,454 | 5/1995 | Togo . |
| 5,685,884 | 11/1997 | Van Den Berg .................... 264/272.16 |

FOREIGN PATENT DOCUMENTS

| | | |
|---|---|---|
| 2576245 | 7/1986 | France . |
| 3064279 | 6/1978 | Japan . |
| 6-37130 | 2/1994 | Japan . |
| 1 313 478 | 4/1973 | United Kingdom . |
| 1 353 603 | 5/1974 | United Kingdom . |
| WO 84/03794 | 9/1984 | WIPO . |

*Primary Examiner*—P. W. Echols
*Attorney, Agent, or Firm*—Dennis DeBoo

[57] ABSTRACT

The encapsulated transducer (10) includes an injection molded encapsulation (20) having a front end (22) and a back end (24). The encapsulation (20) ensconces a sensing element (40) proximate the front end (22) and a portion of a cable (60) which extends from the back end (24). The sensing element or coil (40) is electrically and mechanically connected to the cable (60) by a pair of suitably sized front and rear ferrules (80), (90) secured to a center and coaxial conductor (66), (70) of the associated cable (60) thereby forming a coil and cable assembly (110). At least the rear ferrule (90) includes a shoulder (100) for firmly anchoring the coil and cable assembly (110) within the encapsulation (20). In addition an injection molding process provides the durable encapsulation (20) which bonds with a dielectric (68) of the cable (60) and symmetrically locks the coil and cable assembly (110) therein.

29 Claims, 9 Drawing Sheets

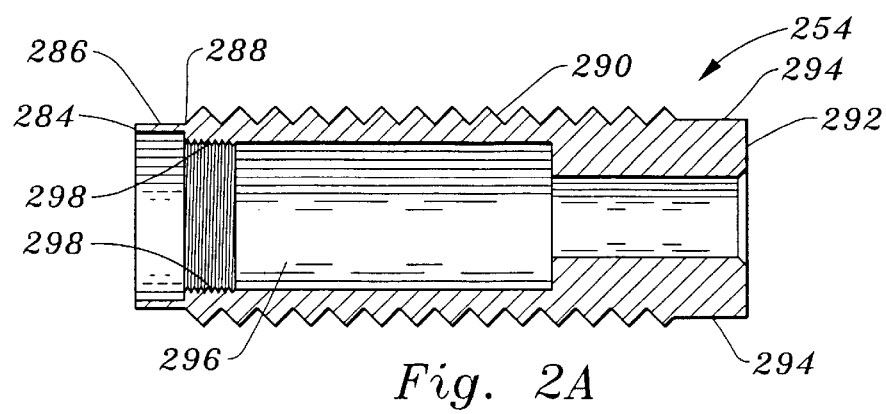
Fig. 2A
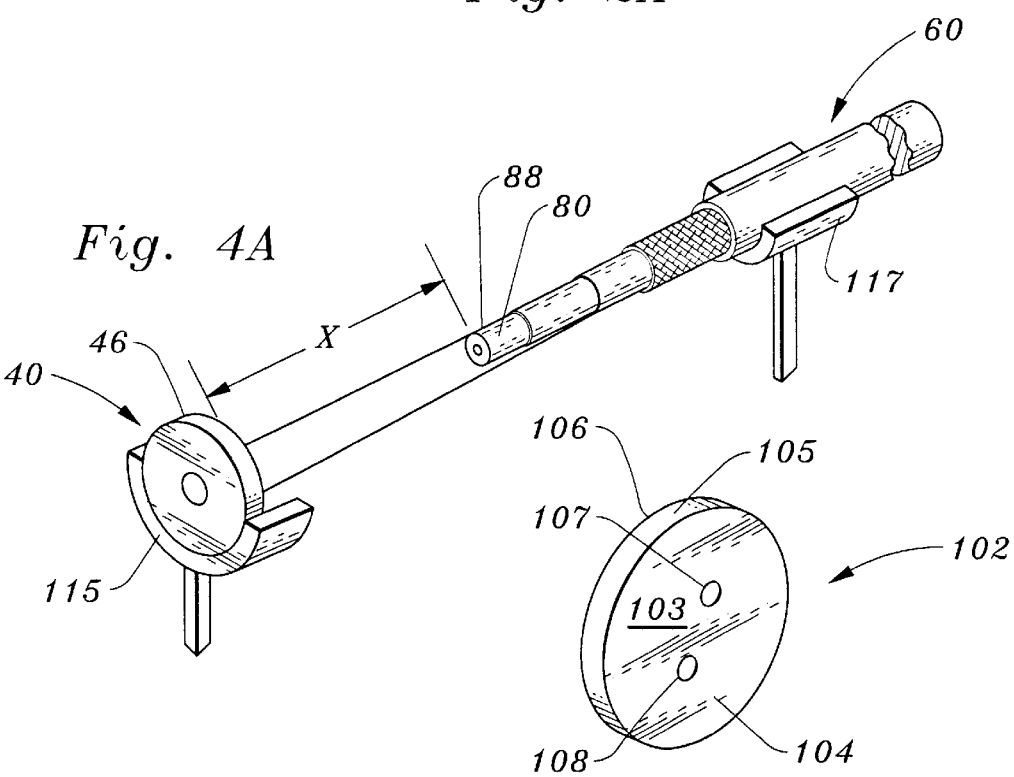
Fig. 4A
Fig. 5A
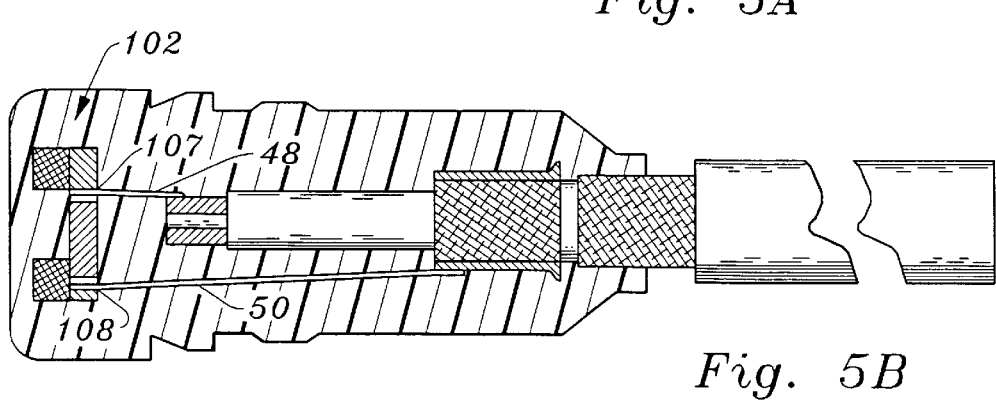
Fig. 5B

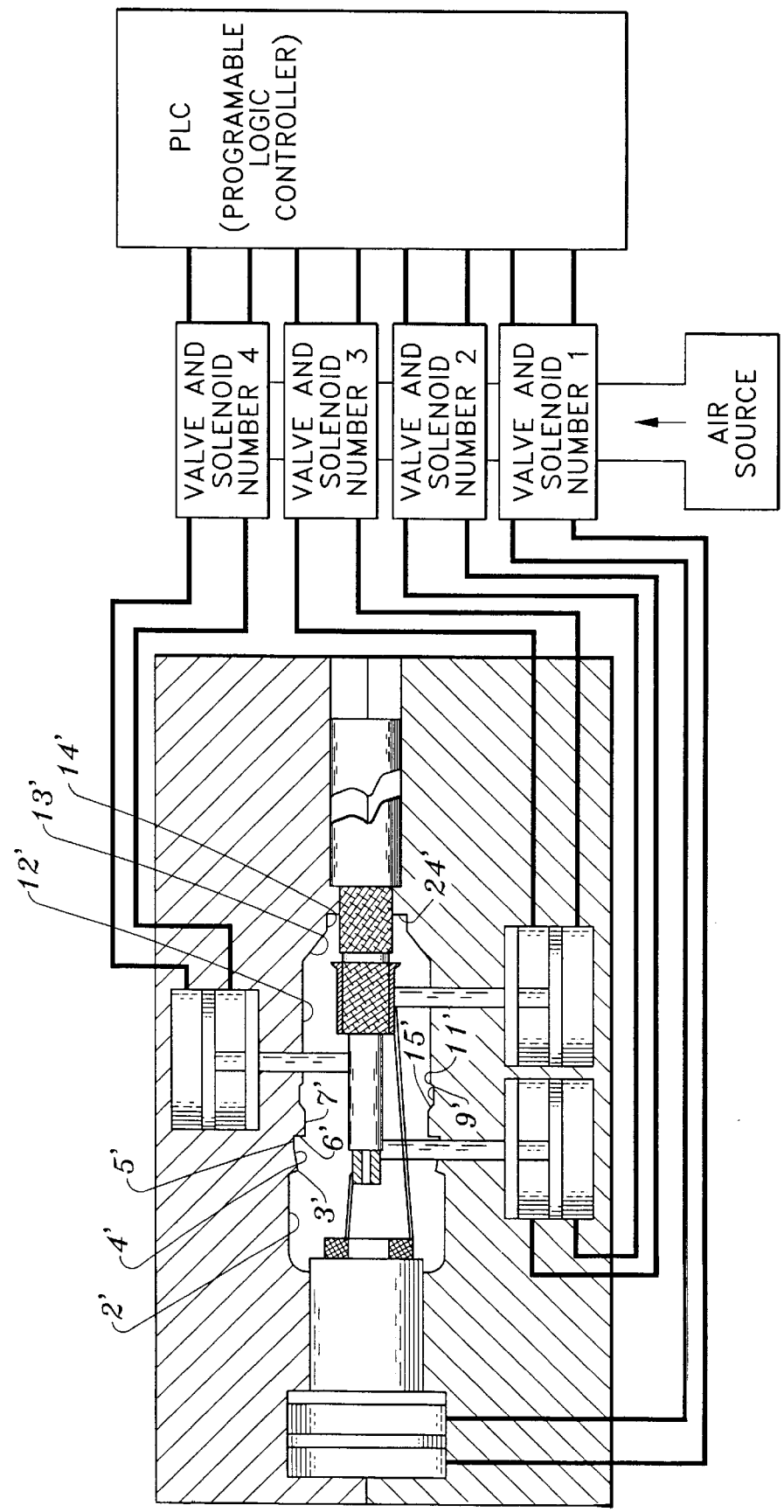

METHOD OF MANUFACTURE OF AN ENCAPSULATED TRANSDUCER

This application is a division of Ser. No. 08/542,534, filed Oct. 13, 1995, now U.S. Pat. No. 5,770,941.

FIELD OF THE INVENTION

The present invention relates generally to an encapsulated transducer and, in particular, to an encapsulated transducer substantially impervious to any mechanical, physical or chemical aggressions from the surrounding environment and a method of manufacturing such transducer which is used to monitor vibration of rotating machinery, temperature sensing and the monitoring and sensing of other physical phenomenon.

BACKGROUND OF THE INVENTION

Monitoring and diagnosing the status of rotating and reciprocating machinery start with accurate and dependable measurements from a transducer and associated electronics and then proceed to other sophisticated analyzing apparatus for reduction and display. One such transducer is a proximity transducer which may be utilized for, inter alia, monitoring the vibration characteristics of a rotating shaft of a machine. In this environment, the transducer must operate under very adverse physical, chemical and mechanical conditions and it is often very difficult to replace such transducers. Thus, there is an ongoing effort to make the proximity transducer one of the most reliable parts of the monitoring system.

Typically, the proximity transducer, in conjunction with associated electronics, outputs a signal correlative to the spacing between an object or "target" (the rotating shaft of the machine) and a sensing coil of the proximity transducer. It is critical that the length or spacing between the "target" and the sensing coil of the proximity transducer remains within the linear range of the transducer for providing accurate and reliable measurements when in operation. Presently, one recurring problem involves producing transducers all of which have similar characteristics so that they can be interchangeable without inordinate, time-consuming calibration.

In addition, the proximity transducer should be able to endure the mechanical, physical and chemical aggression from the surrounding environment. Thus, the hallmark for providing accurate and reliable measurements relies on precision and quality parts and method of manufacturing to form a transducer which is impervious to the predations of the environment and which does not consume an inordinate amount of the linear range of the transducer.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

U.S. PATENT DOCUMENTS

| DOCUMENT NO. | DATE | NAME |
| --- | --- | --- |
| 2,361,348 | October 24, 1944 | Dickson et al. |
| 2,890,505 | June 16, 1959 | Brand |
| 3,932,828 | January 13, 1976 | Plunkeu et al. |
| 4,000,877 | January 4, 1977 | Shead et al. |
| 4,162,138 | July 24, 1979 | Byrne |
| 4,377,548 | March 22, 1983 | Pierpont |
| 4,408,159 | October 4, 1983 | Prox |
| 4,419,646 | December 6, 1983 | Hermle |
| 4,470,786 | September 11, 1984 | Sano et al. |
| 4,680,543 | July 14, 1987 | Kohen |
| 4,829,245 | May 9, 1989 | Echasseriau et al. |
| 4,954,307 | September 4, 1990 | Yokoyama |
| 4,959,000 | September 25, 1990 | Giza |
| 5,016,343 | May 21, 1991 | Schutts |
| 5,018,049 | May 21, 1991 | Mehnert |
| 5,021,737 | June 4, 1991 | Schutts |
| 5,039,942 | August 13, 1991 | Buchschmid, et al. |
| 5,049,055 | September 17, 1991 | Yokoyama |
| 5,122,046 | June 16, 1992 | Lavallee et al. |
| 5,133,921 | July 28, 1992 | Yokoyama |
| 5,138,292 | August 11, 1992 | Forster |
| 5,147,657 | September 15, 1992 | Giza |
| 5,151,277 | September 29, 1992 | Bernardon, et al. |
| 5,182,032 | January 26, 1993 | Dickie et al. |
| 5,226,221 | July 13, 1993 | Kilgore |
| 5,240,397 | August 31, 1993 | Fay et al. |
| 5,252,051 | October 12, 1993 | Miyamoto et al. |
| 5,351,388 | October 4, 1994 | Van Den Berg, et al. |
| 5,376,325 | December 27, 1994 | Ormson |

FOREIGN PATENT DOCUMENTS

| DOCUMENT NO. | DATE | COUNTRY |
| --- | --- | --- |
| UK 1 313 748 | April 18, 1973 | Great Britain |
| UK 1 353 603 | May 22, 1974 | Great Britain |
| JA-139710 | August 6, 1978 | Japan |
| WO 84/03794 | September 27, 1984 | PCT |
| FR 2576-245-A | July 25, 1986 | France |
| JA 6-37130-A | October 2, 1994 | Japan |

The two patents to Schutts and the patent to Van Den Berg, et al. reflect assignee's ongoing commitment to providing an accurate sensor which is impervious to predations of the environment.

The French patent to Jaeger teaches the use of a method and apparatus for injection molding of an elongated detector with a sensor at one end. One end of the detector is supported by the mold while the sensor end is engaged by a centering sleeve (130). The centering sleeve (130) terminates in a piston (132) which is mobile in a cylinder (126) and slides about a fixed rod (138). Thermoplastic is injected into the mold and the centering sleeve is removed from the sensor when the injection process is only partially complete.

The Japanese patent to Kawakami teaches the use of sealing a semiconductor chip by transfer molding. A semiconductor chip (4) is mounted on a carrier (1) and is held at a fixed position via mobile pins (17) and (18). The mobile pins (17) and (18) are movably fitted to a top force (11) and a bottom force (12) for freely advancing or retracting the pins into and out of the cavities (15) and (16). While the pins (17) and (18) are in contact with the carrier (1), a resin (20) is injected into the cavities (15) and (16) through gates (13) and (14) and the pins (17) and (18) are gradually retracted in accordance with the injecting state of resin (20).

The patent to Yokoyama teaches the use of an apparatus for manufacturing plastic encapsulated electronic semiconductor devices. A support pad (11) is firmly fixed by first and second sliders (24A) and (24B) and also by mold halves (19) and (20). The first and second sliders (24A) and (24B) are moved outwardly of a cavity (25) when the cavity is half filled with the plastic encapsulating material. Spaces, which are formed after movement of the sliders, are filled with the plastic encapsulating material directly poured through a gate (23). It should be noted that the sliders (24A), (24B) perform two functions in the cavity (25). The first function is to firmly grasp a thin end portion of the support pad (11) thereby fixing same in position and the second function is to narrow a passage through the gate (23).

The patent to Pierpont teaches the use of a method for encapsulating an electrical component having radial leads. A large multi-cavity mold is loaded with a plurality of horizontal radially leaded capacitors. The closed mold grips the leads (15). A top pin (25) pushes each component body downward a predetermined degree so that each body is left in about the same position within the corresponding mold cavity. A bottom pin (28) then pushes each component body upwardly only slightly above a center of the mold cavity so that upon bottom pin withdrawal, stresses within the lead wires of the electrical component cause the component bodies to spring back just to the mold cavity center portion. Molding resin is then introduced.

The other prior art listed above, but not specifically discussed, teach other sensor devices and molding processes and further catalog the prior art of which the applicant is aware. These references diverge even more starkly from the references specifically distinguished above.

SUMMARY OF THE INVENTION

The present invention is distinguished over the known prior art in a multiplicity of ways. For one thing, the present invention eliminates the number of parts and processes required to form a rugged and reliable encapsulated transducer. For example, the present invention eliminates the complex framework which, inter alia, supported and protected the coil, its relatively fine leads and the electrical connection between the leads of the coil and respective conductors of a cable. In addition, the complex framework used for supporting the coil and cable assembly within a molding cavity also are eliminated.

The proximity transducer of the present invention includes an injection-molded encapsulation enveloping a sensing element at one end and a portion of a cable at the other end. The sensing element is electrically coupled to the cable for transmitting signals from the sensing element to an electrical processing unit. The signals can be correlative of, for example, machine vibration.

Preferably, the sensing element is in the form of a sensing coil having a front face, a back face, a body having an outer surface and a center void extending through the body and at least a first lead and a second lead preferably extending from the back face of the coil and spaced from one another. The body of the coil extends between the front face and the rear face. The leads of the coil may be made robust enough or provided with a protective covering or coating to preclude the encapsulation process from destroying or deforming the leads and thus, resulting in an inoperative or unreliable transducer. The protective coating or covering of the leads is preferably a Parylene coating which is disposed on the leads via, for example, vacuum deposition.

The cable is preferably a triaxial cable comprised of an outer protective jacket circumscribing an interior of the cable which includes three concentrically disposed conductors separated from one another by at least two concentrically disposed insulators. Specifically, the outer protective jacket circumscribes the concentrically disposed triaxial, coaxial and center conductors which are in turn separated from one another by an insulator and a dielectric interposed between the triaxial and coaxial conductors and the coaxial and center conductors, respectively. The dielectric is preferably formed from Teflon® which has been etched for bonding purposes.

At least one end of the cable is stripped in a steplike fashion to expose a length of the center conductor, the dielectric, the coaxial conductor, the insulator and the triaxial conductor. In addition, the encapsulated transducer includes a front ferrule having a bore with an inner diameter substantially equal to the outer diameter of the center conductor and a rear ferrule having a bore with an inner diameter substantially equal to the outer diameter of the coaxial conductor. The front and the rear ferrules are then inserted onto the stripped end of the cable and soldered to the center conductor and the coaxial conductor respectively.

Once the solder has made a permanent mechanical and electrical connection between the front and rear ferrules and the respective conductors, the sensing coil is resistance welded to the ferrules. This is accomplished by resistance welding one lead of the coil to the front ferrule and the other lead of the coil to the rear ferrule.

Prior to the above-delineated step of electrically and mechanically coupling the coil to the cable a substantially cylindrical disk having a pair of apertures may be slideably coupled over the leads and abut a back face of the coil. The disk provides support for the leads especially at a transition area where the leads extend from the back face of the coil and, depending on the thickness of the disk, towards the ferrules. In addition, the disk may be used as a means for receiving at least one slideable pin for locating and supporting the coil and cable assembly within an injection mold.

Once the process of electrically and mechanically coupling the coil to the cable is completed, the coil and cable assembly is ready to be encapsulated using a unique injection molding process. The injection mold is defined by an upper mold plate having an upper cavity and a lower mold plate having a lower cavity. The upper and lower cavities form a mold cavity when in the closed position which is complementary to the desired form of the encapsulation of the coil and cable assembly. The mold cavity is defined by an upper wall, a lower wall, a front wall and a back wall having an opening extending therethrough. Preferably, the upper mold plate and the lower mold plate are each provided with at least one slideable support pin which extends into the respective upper or lower cavity of the mold and when retracted conforms with the desired shape of the respective upper or lower wall of the mold cavity. In addition, a slideable locator pin is provided adjacent the front wall of the cavity and is capable of telescoping into and out of the cavity. Preferably, the locator pin is comprised of a pair of concentrically disposed pins in which an inner pin extends further into the cavity than an outer pin.

The coil and cable assembly is placed into the lower cavity of the lower mold plate such that the cable of the coil and cable assembly extends out the opening of the back wall of the mold cavity. The coil of the assembly is centered and spaced a predetermined distance from the front wall of the mold cavity by way of the slideable locator pin extending into the lower cavity and having the outer pin abutting the front face of the coil and the inner pin being received within the void of the coil. In addition, slideable support pins are extended into the lower cavity and placed in engagement with the ferrules and/or a portion of the stripped end of the cable for supporting and locating the coil and cable assembly. The slideable support pin in the upper mold plate is extended into the upper mold cavity and comes into engagement with the cable when the injection mold is closed. This provides additional means for supporting and centering the coil and cable assembly within the mold cavity such that there is a void completely surrounding the assembly (except of course where the pins are touching the assembly). Note that the location and the number of the slideable support pins may be configured to best support the assembly being encapsulated within the cavity.

Once the mold is in the closed position a moldable material is injected into the mold cavity via runners and gates. This process is preferably continued until the mold cavity is completely filled and the coil and cable assembly is completely ensconced within the moldable material. The cavity of the mold is provided with heating means to inhibit the moldable material from curing prior to the slideable pins being retracted to conform with the respective upper and lower walls of the mold cavity. In this way the moldable material will flow into the voids formed as the slideable pins are withdrawn. An additional charge of moldable material may be injected into the mold as the pins are being withdrawn so as to accommodate for any additional material needed to completely fill the voids left by the previously extended slideable pins. Once the process of injecting the moldable material into the cavity is completed and the pins have been retracted the mold may be opened and the encapsulated transducer allowed to cool in the lower mold plate. Once the encapsulated transducer is cooled the bottom support pins may be actuated to eject the encapsulated transducer therefrom. The encapsulated transducer is preferably circumscribed by an externally threaded metal case used for mounting purposes.

Preferably, the moldable material includes polyphenylene sulfide (PPS), polytetrafluoroethylene (PTFE) which is a Teflon® material. The Teflon® provides a strong bond between the encapsulation and the etched Teflon® dielectric of the cable. In addition, the rear ferrule includes a shoulder which firmly anchors the coil and cable assembly within the encapsulation for resisting axial forces applied to the encapsulation and/or cable.

OBJECTS OF THE INVENTION

A primary object of the present invention is to provide a new and novel encapsulated transducer and a method of manufacturing same.

A further object of the present invention is to provide an encapsulated transducer as characterized above which has an injection molded encapsulation ensconcing a sensing coil at one end and a cable extending out of the other end, one end of the cable being electrically connected to the sensing coil within the encapsulation and the other end connected to an electrical processing unit distal from said encapsulation.

Another further object of the present invention is to provide an encapsulated transducer wherein the encapsulation provides a seamless sealing envelope around the sensing coil and an end portion of the cable thus providing a substantially impervious seal against mechanical, physical or chemical aggressions from the surrounding medium.

Another further object of the present invention is to provide an encapsulated transducer as characterized above which: is comparatively less expensive to manufacture than existing transducers for use in monitoring and diagnosing the status of rotating and reciprocating machinery and which also lends itself to rapid mass production techniques.

Another further object of the present invention is to provide an encapsulated transducer wherein the sensing coil is substantially axially aligned with the front and rear ferrules and the respective conductors of the cable and centered within the encapsulation.

Another further object of the present invention is to provide an encapsulated transducer wherein the encapsulation strongly bonds to a dielectric of the cable for providing a leak tight seal and resisting axial forces.

Another further object of the present invention is to provide an encapsulated transducer wherein a distance between a front face of the sensing coil and a front face of the encapsulation and the relationship of the coil to its connection with the cable are held to a very close tolerances which is reproducible from one transducer to another in mass production to provide uniform transducers.

Another further object of the present invention is to provide an encapsulated transducer having an electrical connection means between at least one lead of the sensing coil and at least one conductor of the cable which provides internal connection strength which anchors the cable within the encapsulation for resisting axial forces applied to the encapsulation or cable which may cause the electrical connections to completely or partially break resulting in an inoperative or unreliable transducer.

Another further object of the present invention is to provide an encapsulated transducer which is able to be mass-produced with reproducible operational characteristics without appreciable alterations of the signal they emit when in operation.

Another further object of the present invention as characterized above eliminates the complex pre-molded framework within the encapsulation.

Another further object of the present invention is to maintain a pre-determined linear range capability for each manufactured transducer.

Another further object of the present invention is to provide a slideable locator pin which centers the coil within the mold cavity and spaces the front face of the coil from the front wall of the mold cavity prior to the injection molding process.

Another further object of the present invention is to provide a plurality of slideable support pins for supporting and centering the coil and cable assembly during the injection molding process.

Another further object of the present invention as characterized above is to provide a single injection molding step which forms the encapsulation of the sensing coil and an end portion of the cable.

Viewed from a first vantage point, it is an object of the present invention to provide a transducer for monitoring the status of rotating equipment, comprising in combination: a sensing element; first and second leads extending from the sensing element; a cable operatively coupled to the leads, and a monolith of cured moldable material ensconcing the sensing element, leads and a portion of the cable defining a seamless mass circumscribing the sensing element, leads and a portion of the cable.

Viewed from a second vantage point, it is an object of the present invention to provide a transducer formed from injection molding, the forming steps including: attaching a coil to a conductor of a cable, centering the coil within a mold cavity with a plurality of supports, supporting the cable within the mold cavity with the plural supports, orienting the cable to extend out from the mold cavity, injecting moldable material into the cavity of the mold to precisely ensconce the coil and the conductor, retracting the plural supports after the moldable material has been injected into the mold cavity, injecting moldable material adjacent the supports for filling in the areas heretofore occupied by the plural supports, allowing the moldable material to set, and removing the thus-formed transducer from the mold as an integrated unit.

Viewed from a third vantage point, it is an object of the present invention to provide a transducer for monitoring the status of rotating equipment wherein a shaft of the rotating equipment is exposed to the transducer, comprising, in combination: means for mounting the transducer a distance from the shaft such that a tangent of the shaft is perpendicular to a long axis of the transducer, the transducer having a sensing coil located proximate the shaft, a front portion of the transducer including a protective wall having uniform thickness along a forwardmost portion of the sensing coil, the sensing coil symmetrically disposed about the long axis, and a protective seamless encapsulation integrally formed with the protective front wall ensconcing the sensing coil and a leading portion of a cable operatively coupled to the sensing coil, the cable extending away from the transducer to an electrical processing unit.

Viewed from a fourth vantage point, it is an object of the present invention to provide a process for making a transducer, comprising the steps of: providing a sensing coil having a center void, a front face, a rear face and at least a first lead and a second lead extending from the sensing coil; providing a cable having at least one outer conductor surrounding at least one insulator carrying at least one center conductor; connecting the cable to the core; supporting and centering the sleeved coil and cable assembly within a mold cavity with at least one support; orienting the cable to extend out from the mold cavity; injecting self-bonding moldable material into the cavity of the mold to precisely ensconce the coil and cable assembly and providing a precise face thickness covering the face of the coil; retracting the supports from the coil and cable assembly so that the self-bonding moldable material will flow into the areas heretofore occupied by the slideable supports; allowing the moldable material to set; and removing the thus formed transducer from the mold cavity as an integrated unit having a seamless mass of moldable material ensconcing the coil and cable assembly.

Viewed from a fifth vantage point, it is an object of the present invention to provide transducer for monitoring the status of rotating equipment wherein a shaft of the rotating equipment is exposed to said transducer, comprising, in combination: means for mounting the transducer a distance from the shaft such that a tangent of the shaft is perpendicular to a long axis of the transducer, the transducer having a sensing coil located proximate the shaft, a front portion of the transducer including a protective wall having uniform thickness along a forwardmost portion of the sensing coil, the sensing coil symmetrically disposed about the long axis, and a protective seamless encapsulation integrally formed with the protective front wall ensconcing the sensing coil and a leading portion of a cable operatively coupled to the sensing coil, and the cable extending away from the transducer to an electrical processing unit.

These and other objects will be made manifest when considering the following detailed specification when taken in conjunction with the appended drawing figures.

BRIEF DESCRIPTION OF THE DRAWINGS

FIG. 2A is a sectional view of a case according to the present invention.

FIG. 4A is a diagrammatic view of a support fixture.

FIG. 5A is an elevational view of a substantially cylindrical disk.

FIG. 5B is an elevational view of the substantially cylindrical disk interposed between the sensing coil and cable.

FIG. 8A is a simplified cross-sectional view of the mold in a closed position having all included slideable pins in an extended position.

DESCRIPTION OF PREFERRED EMBODIMENTS

Figure 1:
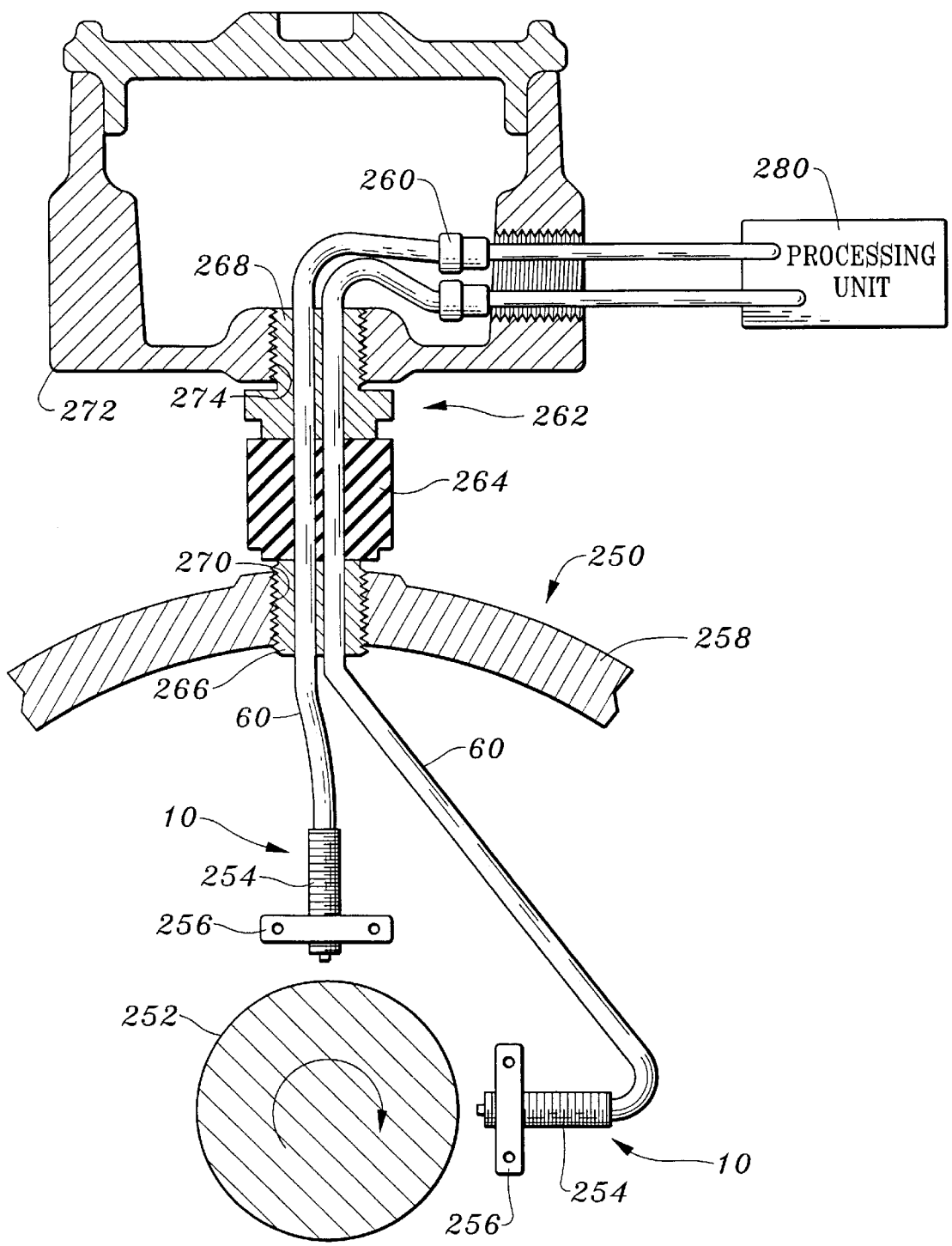
FIG. 1 is an elevational view of an encapsulated transducer according to the present invention which is juxtaposed to a rotating shaft of a machine for monitoring the vibration thereof.

Considering the drawings, wherein like reference numerals denote like parts throughout the various drawing figures, reference numeral 10 is directed to the encapsulated transducer according to the present invention.

Figure 2:
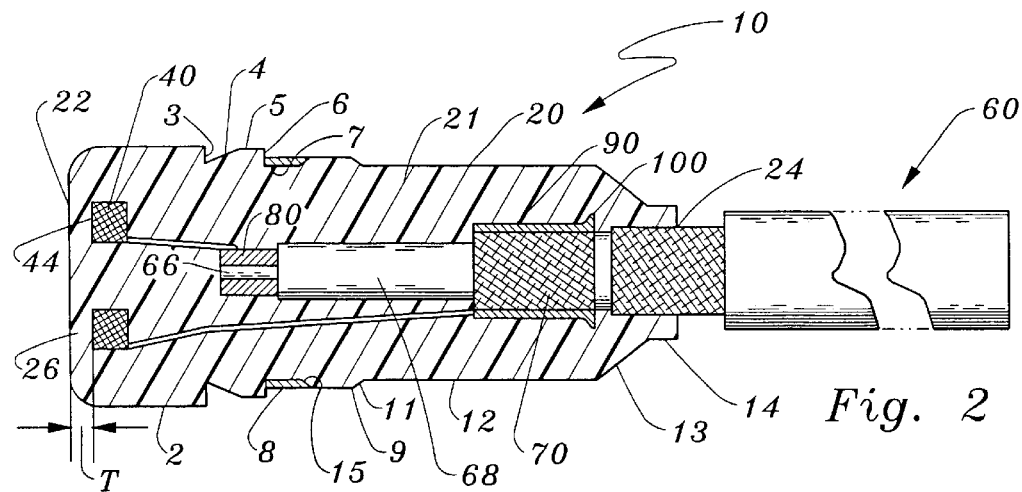
FIG. 2 is a partial sectional view of the encapsulated transducer.
Figure 5:
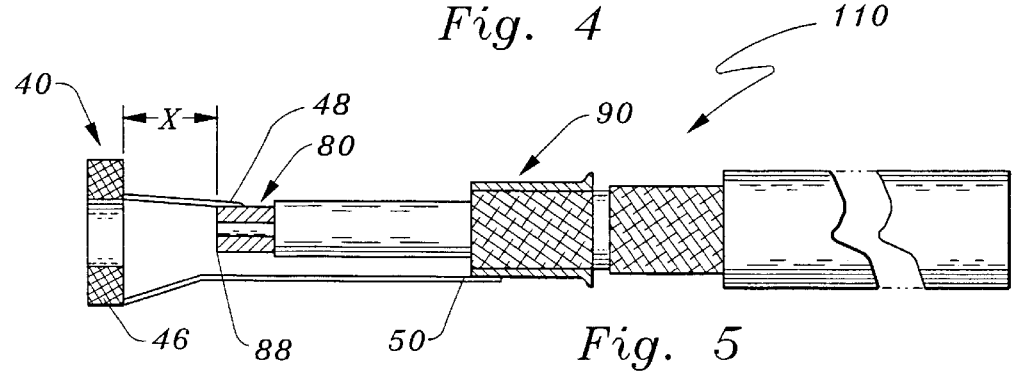
FIG. 5 is an elevational view of a sensing coil and cable assembly formed by the combination of the elements of FIG. 4.

In essence, and referring to FIG. 2, the encapsulated transducer 10 includes an injection molded encapsulation 20 having a front end 22 and a back end 24. The encapsulation 20 is a monolith of cured moldable material ensconcing a sensing element 40 proximate the front end 22 and a portion of an information transmitting medium or cable 60 which extends from the back end 24. The encapsulation 20 includes an integrally formed protective wall having a substantially uniform thickness "T" along a forwardmost portion of the sensing element 40. The sensing element or coil 40 is electrically and mechanically connected to the cable 60 by a pair of suitably sized front and rear ferrules 80, 90 secured to a center and coaxial conductor 66, 70 of the associated cable 60 thereby forming a coil and cable assembly 110 (FIG. 5). At least the rear ferrule 90 includes a shoulder 100 for firmly anchoring the coil and cable assembly 110 within the encapsulation 20. In addition, an injection molding process provides the durable encapsulation 20 which bonds not only with itself, but also with a dielectric 68 of the cable 60 and symmetrically locks the coil and cable assembly 110 therein.

A leading portion of the transducer skin is cylindrical 2 near the coil 40 and has a front wall 26 sealing the coil. Thereafter, the skin steps down 3, then diverges outwardly 4 and transitions to a cylindrical section 5. Another instep 6 leads to a seal groove 7 and seal 8, thence to threads 9 flanked by an up slope 15 and a down slope 11, followed by a long cylinder 12, terminating in an intaper 13, a cylindrical section 14 and the back end 24 which grasps the cable 120 tightly.

Figure 3:
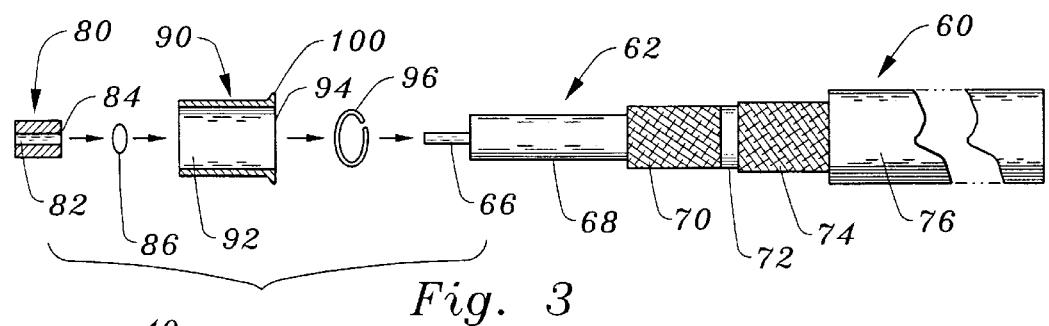
FIG. 3 is an exploded parts view of a portion of FIG. 3 illustrating certain parts in section.

More specifically, and referring to FIG. 3, the cable 60 is preferably a triaxial cable comprised of an outer jacket 76 circumscribing an interior of the cable which includes three concentrically disposed conductors 66, 70 and 74 separated from one another by at least two concentrically disposed dielectrics or insulators 68, 72. The dielectric 68 separates the center conductor 66 from the coaxial conductor 70. The coaxial conductor 70 is in turn separated from the triaxial conductor 74 by insulator 72. The coaxial and triaxial conductors 70, 72 are preferably braided conductors. The dielectric 68 is preferably made from a Teflon® material which has been etched with, for example, sodium naphthalene to enhance bonding with the encapsulation potting compound. As shown in FIG. 3, at least one end 62 of the cable 60 is stripped in a steplike fashion to expose a length of the center conductor 66, the dielectric 68, the coaxial conductor 70, the insulator 72 and the triaxial conductor 74.

Figure 4:
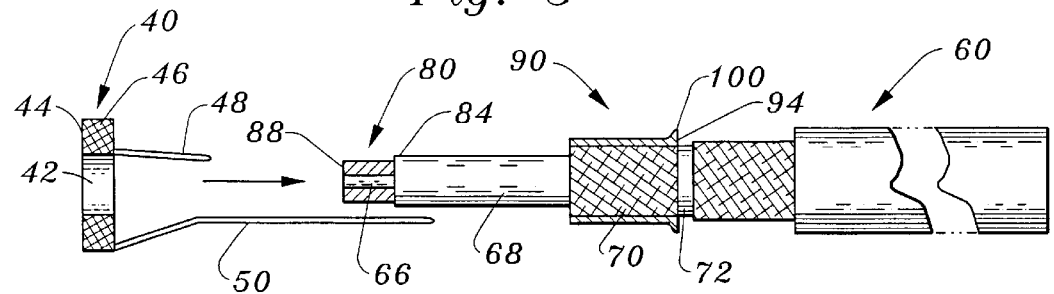
FIG. 4 is a diagrammatic view of an assembly step of the present invention and an elevational view of the combination of the elements of FIG. 3.

Referring to FIGS. 3 and 4, the rear ferrule 90 includes a bore 92 with an inner diameter substantially equal to an outer diameter of the coaxial conductor 70. The rear ferrule 90 is connected to the coaxial conductor 70 such that an end 94 of the rear ferrule abuts the outer insulator 72. The front ferrule 80 includes a bore 82 with an inner diameter substantially equal to the outer diameter of the center conductor 66. The front ferrule 80 is connected to the center conductor 66 such that a back end 84 of the front ferrule 80 abuts the dielectric 68 of the cable 60.

The process of electrically and mechanically connecting the front and rear ferrules 80, 90 to their respective conductors 66, 70 may proceed as follows. A preformed rear solder ring 96 is inserted onto the stripped end 62 of the cable 60 such that it encircles the coaxial conductor 70 and abuts against the coaxial insulator 72. The rear ferrule 90 is then inserted onto the stripped end 62 of the cable 60 such that it encircles the coaxial conductor 70 and comes into engagement with the preformed rear solder ring 96. A preformed front solder ring 86 is then inserted onto the stripped end 62 of the cable 60 such that it encircles the center conductor 66 and abuts against the dielectric 68. The front ferrule 80 is then inserted onto the stripped end 62 of the cable 60 such that it also encircles the center conductor 66 and comes into engagement with the preformed front solder ring 86. This completed cable assembly is positioned in an inductive heating unit where the solder rings 86, 96 are melted and permeate into the adjacent areas between the bores 82, 92 of the front and rear ferrules 80, 90 and the center and coaxial conductors 66, 70 respectively. When the preformed front and rear solder rings 86, 96 have melted, a small amount of axial force is applied to the front and rear ferrules so that the back end 84 of the front ferrule 80 abuts against the dielectric 68 and the end 94 of rear ferrule 90 abuts against the coaxial conductor 70. Once the solder is cooled, it locks the rear ferrule 90 to the coaxial conductor 70 and the front ferrule 80 to the center conductor 66 in a spaced coaxial proximity from one another. Preferably, both ferrules 80, 90 are formed from brass. In addition, the use of preformed solder rings 86, 96 helps to provide effective repeatability of the electromagnetic characteristics of the encapsulated transducer especially with respect to the inductance parameter of the sensing coil 40.

Once a permanent mechanical and electrical connection has been made between the front and rear ferrules 80, 90 and the respective conductors 66, 70, the sensing coil 40 is resistance welded to the front and rear ferrules 80, 90. Referring to FIGS. 4, 4A and 5, the sensing coil 40 includes a center void 42, a front face 44, a back face 46 and first and second leads 48, 50 extending from the back face 46 of the coil 40 and spaced from one another. The coil 40 and the cable 60 are supported by a fixture (shown diagramatically in FIG. 4A) so that the back face 46 of the coil 40 and a front end 88 of the front ferrule 80 are held at a constant distance "X" (FIG. 5) by a series of cradles 115, 117 held in fixed relationship one to the other. The fixture substantially maintains this distance "X" when the first lead 48 is resistance welded to the front ferrule 80 and the second lead 50 is resistance welded to the rear ferrule 90. Thus, the distance "X" between the back face 46 of the coil 40 and the remaining metal portions of the coil and cable assembly 110 provide an electromagnetic relationship of the coil 40 which is precisely fixed and can be repeated for standardization of transducers requiring minimal calibration. As noted above, resistance welding is used to connect the leads 48, 50 to the respective ferrules 80, 90 however, solder or laser welding may also be used.

Preferably, at least the relatively fine leads 48, 50 of the coil 40 and perhaps the coil and ferrules are provided with a protective covering or coating to preclude the encapsulation process from destroying or deforming the relationship of the leads 48, 50 to the coil and ferrules. This minimizes the likelihood of making a transducer which is anomalous, inoperative or unreliable. Because an inoperative, out of specification or unreliable transducer will likely be detected only after the entire encapsulation process is completed, losses are most costly.

One preferred protective coating is taken from a class of coatings from the family of polymers described generically as simple or substituted poly-para-xylylene. The class of atoms substituted for one or more of the aromatic hydrogens is halides, especially chlorine.

The chemical properties of a coating comprised of a poly-para-xylylene compounds are barrier resistant to moisture vapor and other chemical transmission as well as resistant to solvent permeation. Additionally, the parylene coating is resistant to degradation by gama radiation and provides strength to fragile wire bonds. Finally, when used in a vapor deposition application process, the parylene coating has a high penetrating capability for complex restricted surface geometry of an object to be coated along with good to excellent adhesion of the parylene polymer to surfaces, especially if the surfaces have been pretreated with an organic silane.

One preferred protective coating or covering of the leads 48, 50 can be a Parylene coating which is disposed on the leads via, for example, vacuum deposition. Parylene and Parylene coating processes are provided by Specialty Coating Systems, Inc. NOVA TRAN® Parylene Coating Services, 5707 West Minnesota Street, Indianapolis, Ind. 46241.

Referring to FIG. 5A and 5B, prior to the above delineated step of electrically and mechanically coupling the coil 40 to the cable 60, a substantially cylindrical disk 102 may be interposed between the back face 46 of the coil 40 and the front end 88 of the front ferrule 80. Specifically, the substantially cylindrical disk 102 is provided which includes a first side 103, a second side 106 and a center portion 104 having an outer peripheral surface 105 extending from the first side 103 to the second side 106. A pair of apertures 107, 108 extend through the center portion and the first and second sides 103, 106 of the disk. The disk 102 slides over the leads such that lead 48 extends through aperture 107 and lead 50 extends through aperture 108 or conversely.

The first side 103 of the disk 102 preferably abuts the back face 46 of the coil 40. The disk is used to provide support for the leads 48, 50 at a transition area where the leads extend from the back face 46 of the coil 40. In addition, the disk 102 may be used as a means for receiving at least one slideable support pin for locating and supporting the coil and cable assembly 110 within an injection mold 120. In this event, a locating hole 108 (e.g. FIG. 5A) passes through a center of the disk to receive the pin.

Figure 6:
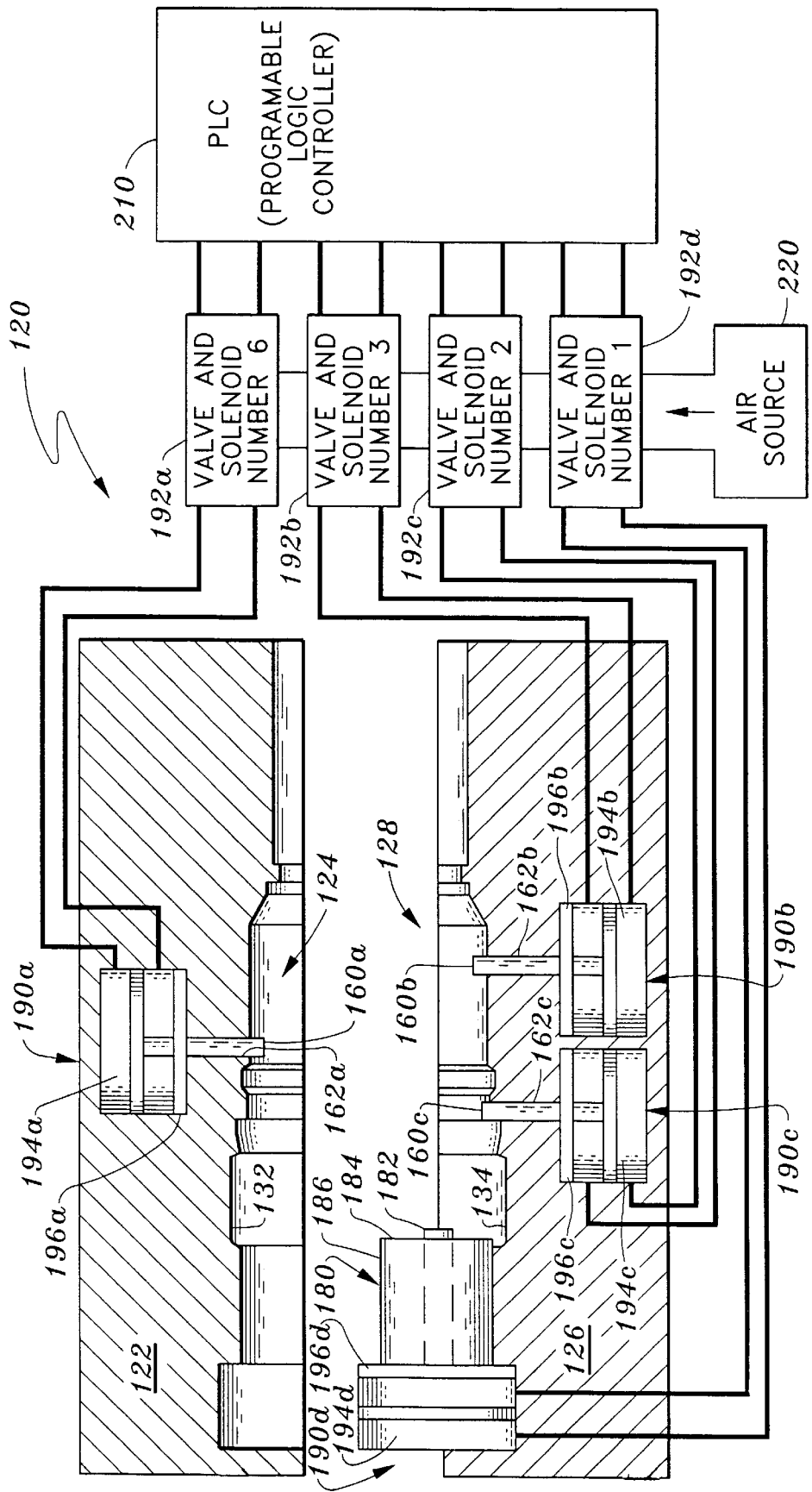
FIG. 6 is a simplified cross-sectional view of a mold in an open position and having all included slideable pins in an extended position.
Figure 8:
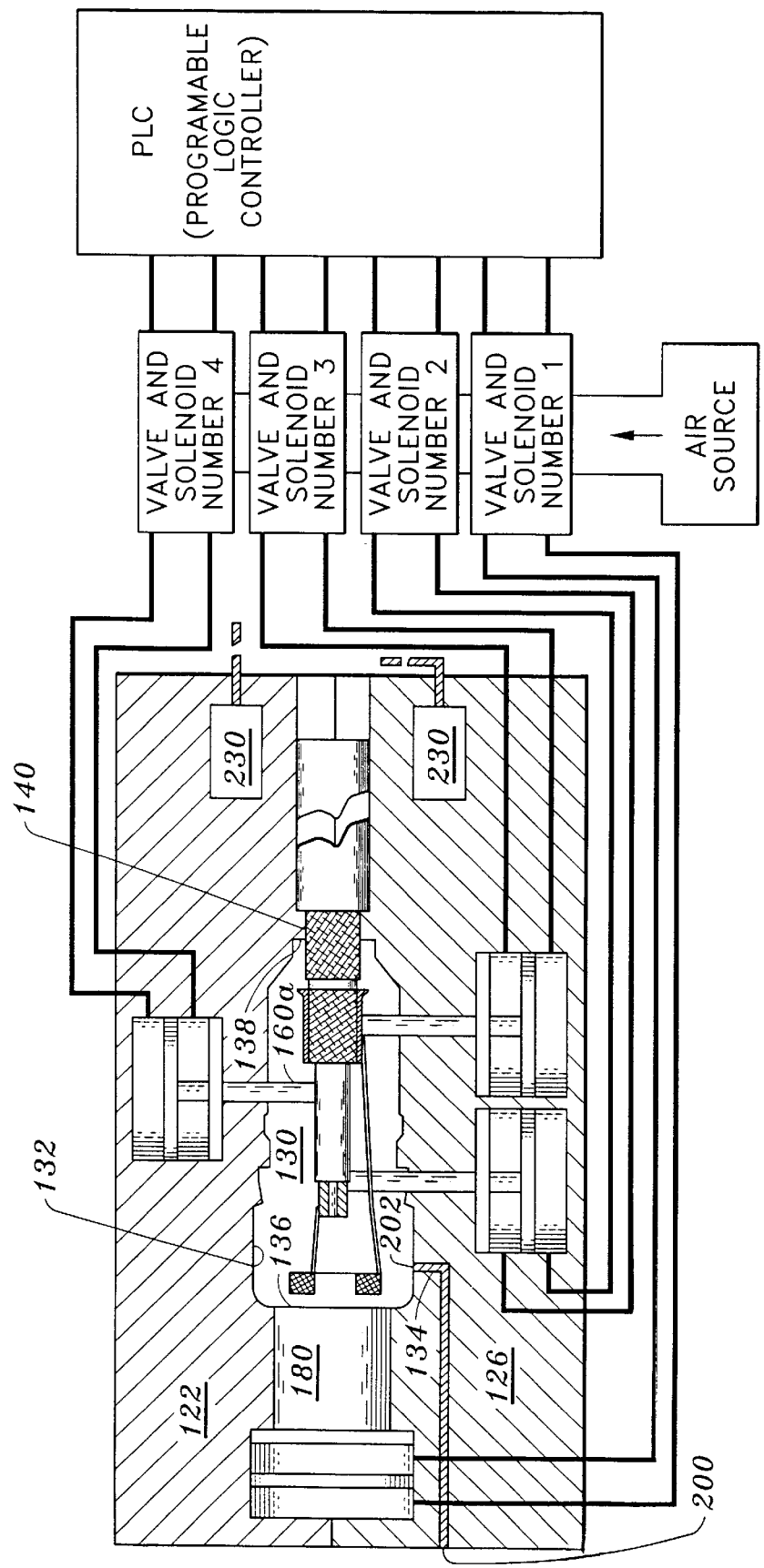
FIG. 8 is a simplified cross-sectional view of the mold in a closed position with a slideable locator pin retracted from engagement of the sensing element.

Once the process of electrically and mechanically coupling the coil 40 to the cable 60 is completed, the coil and cable assembly 110 is ready to be encapsulated using a unique injection molding process. Referring to FIGS. 6 and 8, an injection mold 120 is defined by an upper mold plate 122 having an upper cavity 124 and a lower mold plate 126 having a lower cavity 128 forming a single mold cavity 130 when in the closed position. The mold cavity 130 is shaped complementary to the desired form of the encapsulation 20 of the coil and cable assembly 110. The mold cavity 130 is defined by an upper wall 132, a lower wall 134, a front wall 136 and a back wall 138 having an opening 140 extending therethrough (FIG. 8).

The upper mold plate 122 is provided with at least one sleeve 162*a* through which at least one slideable support pin 160*a* may be moved into or out of the upper cavity 124 by a drive means 190*a*. The lower mold plate 126 is preferably provided with a pair of sleeves 162*b*, 162 *c* through which a pair of slideable support pins 160*b*, 160*c* may be moved into or out of the lower cavity 128 by corresponding drive means 190*b* and 190*c*. In addition, the injection mold 120 is provided with a slideable locator pin 180 which is preferably disposed on the lower mold plate 126 at a location adjacent the front wall 136 of the mold cavity 130. The slideable locator pin 180 preferably includes a pair of concentrically disposed slideable pins 182, 184 in which an inner pin 182 slides within an outer pin 184 which in turn slides within a sleeve 186. Both the inner pin 182 and the outer pin 184 may be moved by an associated drive means 190*d* such that they are capable of extending into or out of the lower cavity 128. Preferably, the inner pin 182 is capable of extending further into the lower cavity 128 than the outer pin 184. In fact, pin 182 may register with disk 102 via hole 108.

Alternatively, the inner pin 182 may not be retractable within the outer pin 184, but rather, remains in an extended and rigidly fixed position with respect to the outer pin 184.

The slideable support pins 160*a*–160*c* and the slideable locator pin 180 are each preferably provided with separate drive means, 190*a*–190*d* respectively and may be independently controlled by a programmable logic controller (PLC) 210 or the like.

Each drive means 190*a*–190*d* includes a valve and solenoid unit 192*a*–192*d*, a pneumatic cylinder 194*a*–194*d* and an ejector plate 196*a*–196*d*. Each ejector plate 196*a*–196*c* is connected to each respective support pin 160*a*–160*c* and ejector plate 196*d* is connected to locator pin 180. Each ejector plate 196*a*–196*d* is received within the corresponding pneumatic cylinder 194*a*–194*d* which in turn is connected to the corresponding valve and solenoid unit 192*a*–192*d*. Each valve and solenoid unit 192*a*–192*d* is electrically connected to the PLC 210 and mechanically connected to a gas source 220. The PLC 210 independently sends out an electrical signal to each solenoid of each valve and solenoid unit 192*a*–192*d*. Each solenoid receives the signal and physically opens and closes the corresponding valve. This allows gas to be sent to each respective pneumatic cylinder 194*a*–194*d* and depending on the location of each ejector plate 196*a*–196*d* will cause each support pin 160*a*–160*c* and locator pin 180 to extend into or retract out of the mold cavity 130. The ejector plate 196*d* may be coupled to the inner pin 182 such that the inner pin 182 extends or retracts a short distance and then catches the outer pin 184 and causes it to correspondingly extend or retract.

Depending upon the specific assembly 110 configuration and the way molten plastic is filling around the assembly 110, one of the slideable pins may be retracted sooner than another. Retracting the slideable pins is sequenced with the timing in the PLC 210 and may be calibrated until all of the slideable pins retract in a manner which allows the assembly 110 to remain centered both radially and axially within the mold cavity 130. Note that if the retraction of the support pins 160*a*–160*c* is not sequenced correctly the assembly 110 may shift to one side or the other in the mold cavity 130. This may cause an alteration of the electrical characteristics of the encapsulated transducer 10.

Figure 7:
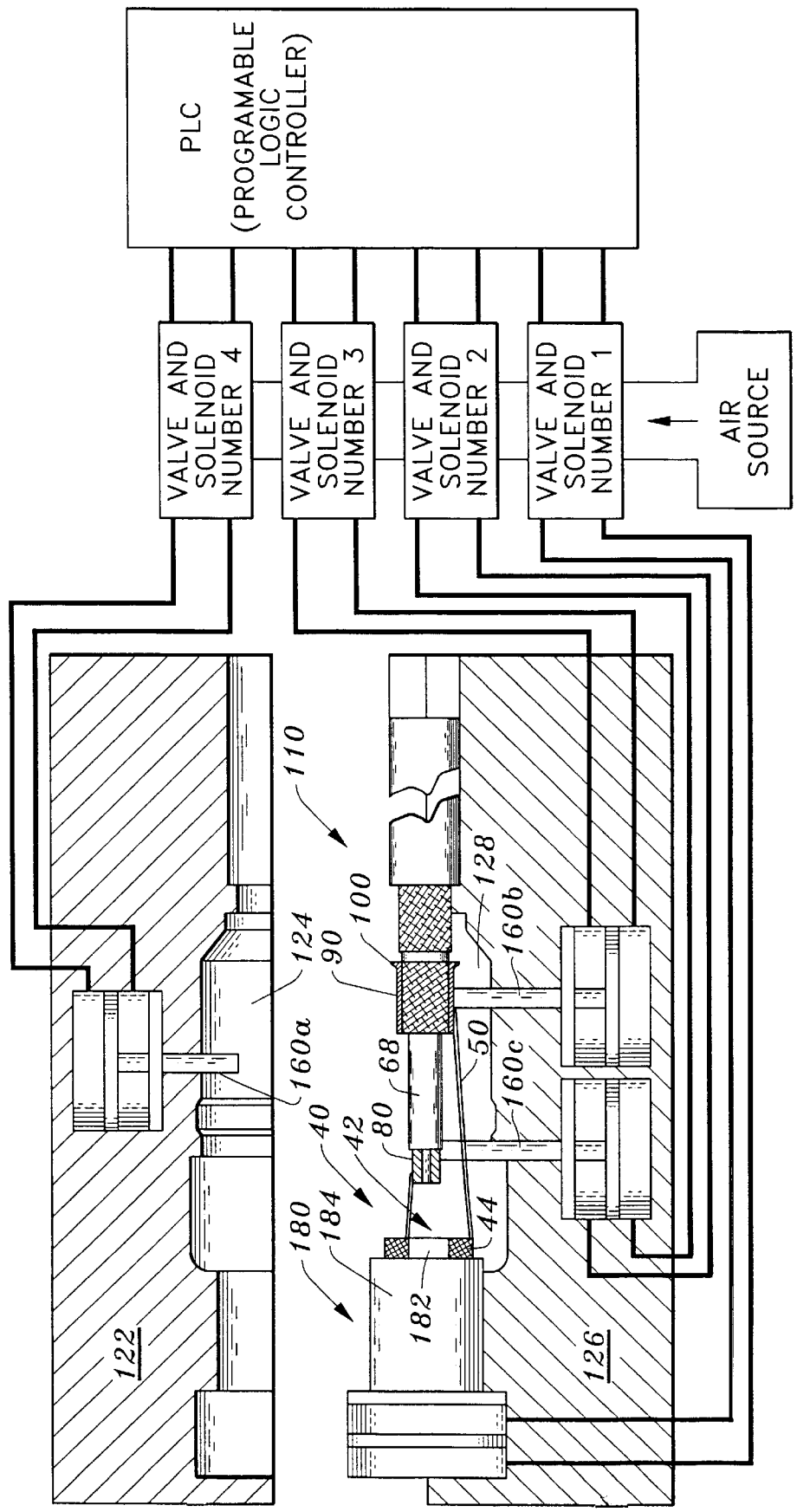
FIG. 7 is a view of the mold of FIG. 6 with the slideable pins centering, supporting and locating that which is shown in FIG. 5.

Referring to FIG. 7, the coil and cable assembly 110 is radially and axially centered by way of the extended support pins 160*b*, 160*c* and an extended locator pin 180. The locator pin 180 centers the coil 40 and spaces it a predetermined distance from the front wall 136 of the mold cavity 130 by way of the inner pin 182 being received within the void 42 of the coil 40 and the outer pin 184 abutting against front face 44 of the coil 40. In addition, support pin 160*c* is extended into the lower cavity 128 and placed in engagement with the dielectric 68 and the front ferrule 80 for providing support thereto. Support pin 160*b* also extends into the lower cavity 128 and abuts the rear ferrule 90. It is important that the second support pin 160*b* abuts the rear ferrule 90 so as not to break the connection between the rear ferrule 90 and the coil lead 50 of the coil 40. In addition, a groove or shoulder may be provided to locate the engagement of the support pin 160*b* with the rear ferrule 90. Once the coil and cable assembly 110 has been centered within the lower cavity 128, the locator pin 180 may be withdrawn or retained in the extended position when the mold 120 is placed in a closed position (FIG. 8). At this time, the front face 44 of the coil 40 is precisely spaced from the front wall 136 of the mold cavity 130. This allows the encapsulated transducer 10 to include a substantially constant face thickness "T" (FIG. 2) and thus, a predetermined linear range. This is particularly important when manufacturing a plurality of encapsulated transducers 10 to assure they all have the same electrical characteristics. Furthermore, once the mold is closed the cable 60 extends out of the opening 140 in the back wall 138 of the mold cavity 130. The engagement of the upper mold plate 122 and the lower mold plate 126 provides additional support by having the cable 60 cantilevered therebetween. Support pin 160*a* extends into the upper cavity 124 from the upper mold plate 122 and comes into engagement with the dielectric 68 of the cable 60 thereby providing a top support to the coil and cable assembly 110. A void completely surrounds the coil and cable assembly 110 except of course where the pins 160*a*–160*c* are abutting the assembly 110. An alternative embodiment to FIG. 8 may use fewer or more support pins 160*a*–160*c* for centering and supporting the coil and cable assembly 110 in the mold cavity 130.

Typically, the injection molding process is a process in which moldable material is injected into the mold cavity between 640° F. and 680° F., but the range can vary from 200° F. to 1000° F. depending on the material used. The pressure at which the moldable material is injected may vary as a function of temperature of the material. This process is altered according to the present invention so that the moldable material does not destroy or mechanically alter the sensing coil 40 and its associated leads 48, 50 and their relative relationship with respect to the ferrules. One way of accomplishing this is to provide heating means 230 to the upper and lower mold plates 122, 124. By heating the upper and lower mold plates 122, 124 the moldable material can be injected into the mold cavity 130 at relatively low pressure and low velocity thereby minimizing or eliminating damage to the coil and cable assembly 110 which is exposed to the moldable material. Preferably, the heating of the mold plates can vary from that which is slightly above room temperature to 1,000° F. Typically, the mold plates are heated to a temperature range between 250° F.–280° F. to minimize cycle time, but can range to a temperature which is generally comparable to the moldable material to further lower the pressure and velocity at which the moldable material is injected. This however, tends to increase the time the transducer needs to cure, which in turn, increases cycle time.

The moldable material is injected into the mold cavity (FIGS. 6, 8 and 9) via runners 200 and gates 202 provided in the lower mold plate and/or the upper mold plate. Preferably, the moldable material includes Polyphenylene Sulfide (PPS) and a percentage of Polytetrafluoroethylene (PTFE) which is a Teflon® material. The Teflon® provides a strong bond between the encapsulation 20 formed by the moldable material and the etched Teflon® dielectric 68 of the cable 60. The range of PTFE can vary (especially with temperature) between 0.01% and 0.50%, but preferably ranges between 20%–30%. The injection of the moldable material is continued until the mold cavity 130 is completely filled. Once the mold cavity is filled, the support pins 160a–160c are sequentially retracted such that the coil and cable assembly 110 remains centered within the mold cavity 130. As a result of the upper and lower mold plates 122, 124 being heated the moldable material remains in a substantially molten state and will flow into the voids left behind by the retraction of the support pins 160a–160c. Note that an additional charge of moldable material may be introduced into the mold cavity 130 simultaneously with the retractions of the support pins 160a–160c such that the coil and cable assembly 110 is completely ensconced within the moldable material and all voids have been filled. The slideable locator pin 180 may be retracted prior to the injection mold being placed in a closed position or at anytime thereafter. Preferably, the slideable locator pin 180 is retracted prior to the completion of injecting the moldable material into the mold cavity 130 in order to allow the material to freely ensconce the coil.

Figure 9:
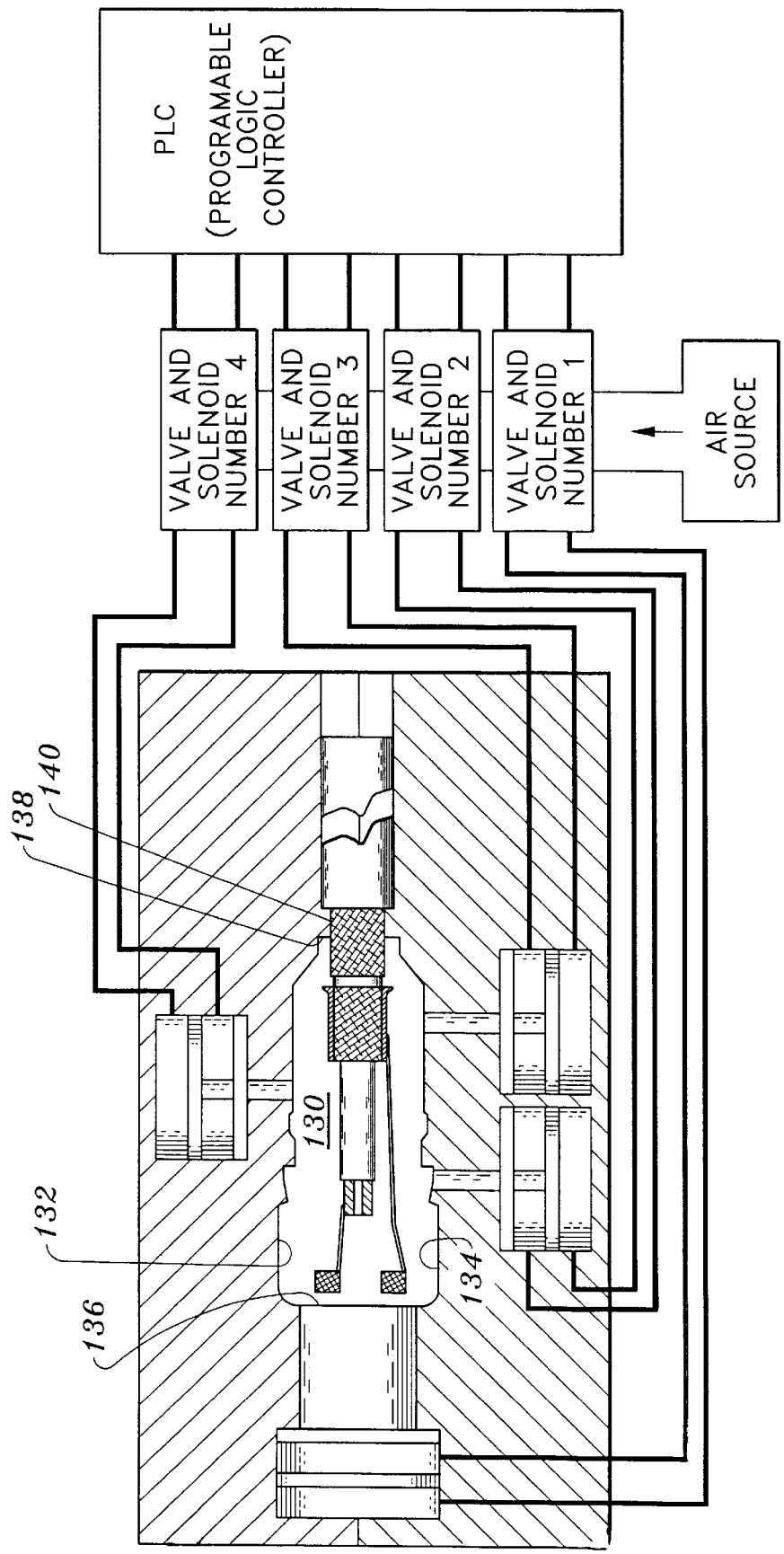
FIG. 9 is a simplified cross-sectional view of the mold in a closed position with the slideable support pins retracted after an injection molding according to the present invention.

Referring to FIG. 9, once the process of injecting the moldable material into the mold cavity 130 is completed and all of the pins have been retracted, the mold 120 may be opened and the encapsulated transducer 10 allowed to cool in the lower mold plate 126. Once the encapsulated transducer is cooled one or more of the bottom support pins 160b, 160c may be actuated to eject the encapsulated transducer 10 therefrom.

The mold cavity 130 of the injection mold 120 has a form complementary to the encapsulated transducer 10. Referring to FIG. 8A, the leading portion of the mold cavity includes a cylindrical section 2' near the coil 40. Thereafter, the cavity includes a step down 3' which diverges outwardly 4' and transitions to a cylindrical section 5'. Another instep 6' leads to a seal groove former 7' thence to a thread former 9' flanked by an upslope 15' and a downslope 11'. The downslope 11' is followed by a long cylinder 12' terminating in an intaper 13', a cylindrical section 14' and a back end 24' which grasps the cable 120.

Referring to FIG. 2A, the encapsulated transducer 10, for example and by way of illustration but not limitation, is preferably circumscribed by a substantially cylindrical metal case 254. The case includes a leading end 284, a neck 286 below the leading end, a shoulder 288 below the neck and a threaded shaft 290 extending below the shoulder towards a trailing end 292 of the case. Multiple facets 294 are arranged proximate the trailing end 292 of the case to allow a torque applying device to effectively engage the metal case. The case has an interior passageway 296 communicating the leading end with the trailing end.

The interior passageway 296 includes interior threads 298 proximate the leading end of the case and preferably below the shoulder. The interior threads couple with the threads 9 on the skin of the encapsulation and the neck is crimped about the diverging section 4 of encapsulation to secure the metal case about the encapsulated transducer 10. A gasket seal 8 rides in groove 7 of encapsulation and is secure tightly within the interior passageway.

Figure 10:
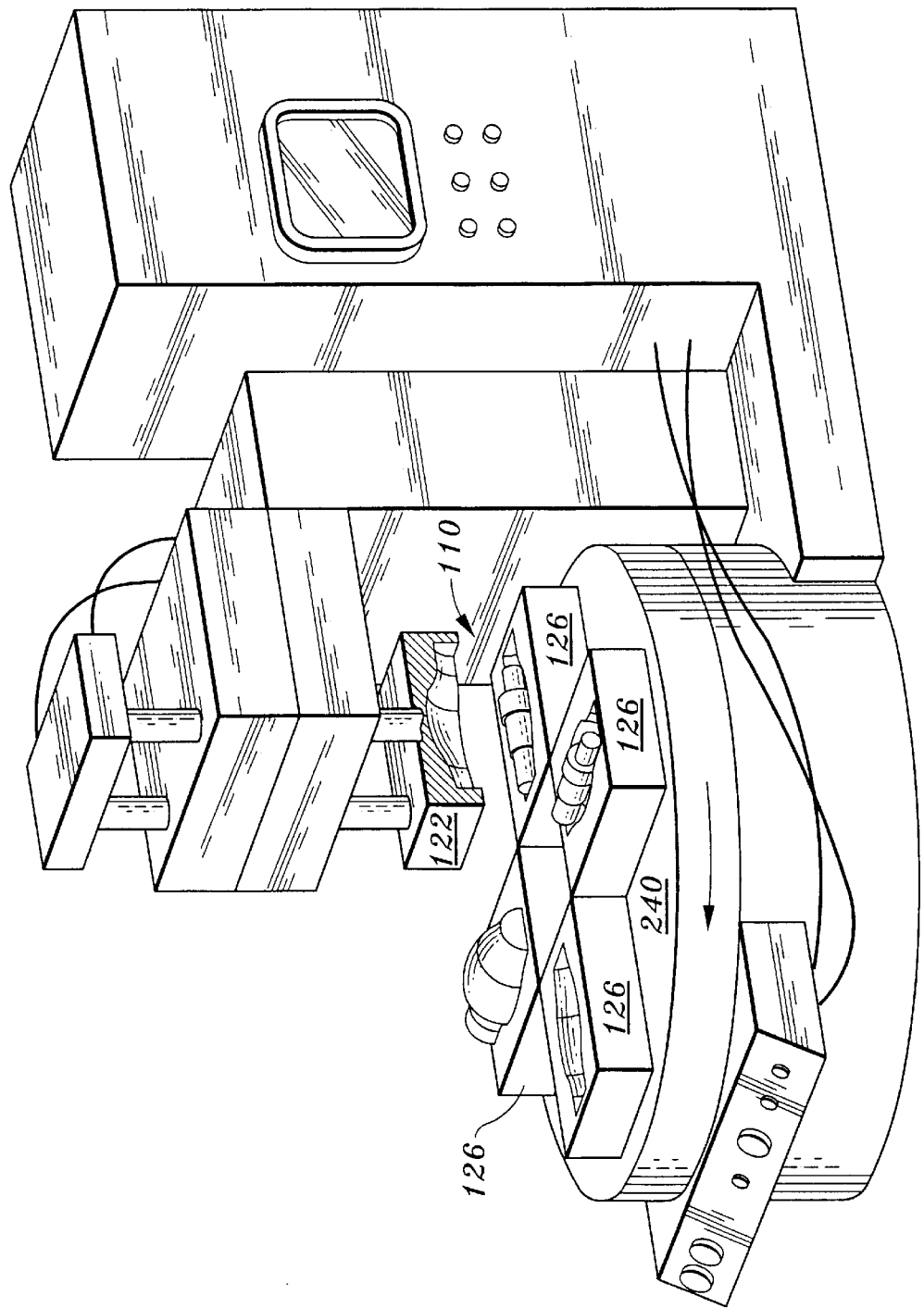
FIG. 10 is an elevational view of an injection mold used to mass-produce a plurality of encapsulated transducers sequentially.

In mass production, (e.g. FIG. 10) it is preferred that an injection molding device be provided which includes a single upper mold plate 122 and a plurality of lower mold plates 126 disposed on a rotatable table 240. The lower plates 126 may each be preloaded with a single coil and cable assembly 110. Then, the upper mold plate 122 comes down onto the first inline lower mold plate 126 and the respective coil and cable assembly 110 is encapsulated. Once the encapsulation process is completed the lower mold plate is lifted and the table is rotated to align a subsequent lower mold plate 126 with the stationary upper mold plate 122 so that the encapsulation process may be repeated. This process may continue for encapsulating a batch of coil and cable assemblies.

As noted above, the upper and lower mold plates 122, 126 are heated by heating means 230. Therefore, after the encapsulation process is complete and the upper mold plate 122 is lifted from the lower mold plate 126, the table 240 is rotated and the corresponding encapsulated transducer 10 remains within the lower mold plate 126. This particular lower mold plate 126 has the heating means 230 turned off so that the molten resin is allowed to solidify. For example, if the encapsulation process is completed at a twelve o'clock position on the rotatable table 240 the encapsulated transducer 10 may remain within the lower mold plate 126 and be allowed to cool until the table has rotated from the twelve o'clock position to a six o'clock position where it is ejected as delineated above. Now, after the encapsulated transducer 10 is ejected from the lower mold plate 126, the lower mold plate is reloaded with a coil and cable assembly 110 and reheated while it extends from the six o'clock position back to the twelve o'clock position as the table 240 is rotated. Preferably, this particular lower mold plate is at the desired temperature by the time it is back between an eleven o'clock and twelve o'clock position.

In use and operation, and referring to FIGS. 1 and 2, the encapsulated transducer 10 may, for example, be utilized as a proximity transducer for monitoring the vibrational characteristics of a rotating shaft 252 of a machine 250. In this environment the encapsulated transducer 10 operates on the eddy current principle and outputs a signal correlative to the spacing between the rotating shaft 252 and the sensing coil 40 of the encapsulated transducer 10.

Typically, the encapsulated transducer 10 is circumscribed by a threaded metal case 254 which is mounted adjacent the rotating shaft of the machine 250. A mounting means 256 is used to strategically mount the encapsulated transducer 10 such that the sensing coil 40, proximate the front end 22 of the encapsulation 20, and the rotating shaft 252 are in a juxtaposed relation. The sensing coil 40 is electrically and mechanically connected to the cable 60. The cable 60 extends out the back end 24 of the encapsulation 20 and runs through a casing 258 of the machine 250 where it preferably terminates to a connection 260 capable of directly coupling to the electrical processing unit 280 or to an extension cable which in turn couples to the electrically processing unit 280.

Preferably, the cable is routed through the machine case 254 by passing through a rubber grommet 264 internal to an adaptor 262 operatively coupled to the machine case 258. The adaptor 262 includes a first end 266 having external and internal threads. The external threads of the adaptor are coupled with a threaded bore 270 in the machine case 258 for firmly connecting the adaptor thereto. In some instances, the internal threads of the first end of the adaptor allow the mounting of the encapsulated transducer 10 via the threaded metal case 254. A second end 268 of the adaptor 262 having external threads may be coupled to a threaded aperture 274 in a junction box 272 such that the junction box is mounted to the machine case 258. The junction box 272 allows any electrical connections operatively coupling the cable 60 to the electrical processing unit 280 to be enclosed in a weather-proof or explosion-proof environment.

In addition to use as a proximity transducer, the present invention may be employed very broadly in the monitoring and diagnostic field. One example is as a temperature transducer which would use a coil formed from a single wire thermocouple of the RTD type. The coil would be molded within the encapsulation 20 and the only change in the above delineated process may be in the use of perhaps a thinner overall encapsulation. This would provide for a suitable heat transfer to the RTD temperature sensing coil.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A process for making a transducer, comprising the steps of:
   providing a sensing coil having a center void, a front face, a rear face and at least a first lead and a second lead extending from said sensing coil;
   providing a cable having at least one outer conductor surrounding at least one insulator carrying at least one center conductor;
   connecting the at least one outer conductor and the at least one center conductor to the first and seconds leads of the coil respectively;
   supporting and centering the coil within a mold cavity with at least one slideable support;
   orienting the cable to extend out from the mold cavity;
   injecting self-bonding moldable material into the cavity of the mold to precisely ensconce the coil by molding an encapsulation of the moldable material over the leads of the coil, over the entire exterior of the coil including both the front and rear faces and within the center void of the coil and providing a precise face thickness covering the front face of the coil;
   retracting the at least one slideable support supporting the coil so that said self-bonding moldable material will flow into the areas heretofore occupied by the at least one slideable support and extend completely through the center void;
   allowing the moldable material to set; and
   removing the thus formed transducer from the mold cavity as an integrated unit having a mass of moldable material completely ensconcing the coil.

2. The process of claim 1 wherein said cavity has a contour which includes a cylindrical portion at a leading end and thereafter a step down which diverges outwardly transitioning to a cylindrical section, thereafter an instep, a seal groove former, a thread former which is flanked by an upslope and a downslope which is followed by a long cylinder terminating in an intaper, a cylindrical section and a back end;
   whereby the contour of said cavity forms the contour of the transducer which includes a transducer skin sequentially having a cylindrical leading portion proximate the coil and a front wall sealing the coil, a step down which diverges outwardly and transitions to a cylindrical section, an instep which leads to a seal groove thence to threads flanked by an upslope and a downslope, followed by a long cylinder terminating in an intaper, a cylindrical section and a back end which grasps a cable tightly.

3. A process for making a transducer, comprising the steps of:
   providing a coil having a center void and first and second leads extending from the coil;
   connecting the leads of the coil to conductors of a cable;
   injection molding an encapsulation of material over an entire exterior of the coil, within and completely through the center void of the coil and over a portion of the cable defining a unitary mass ensconcing both the exterior and center void of the coil, leads and the portion of the cable.

4. The process of claim 3 wherein the injection molding step includes molding an uninterrupted front wall with uniform thickness abutting and uniformly extending from a front face of the coil defining a forward most portion of the unitary mass.

5. The process of claim 4 wherein the injection molding step includes centering the coil within a mold cavity with at least one support.

6. The process of claim 5 wherein the step of centering the coil within the mold cavity includes the step of centering the coil with an axially retractable support being received within the center void of the coil.

7. The process of claim 6 wherein the injection molding step includes supporting the cable within the mold cavity with at least one retractable cable support and axially aligning the coil with respect to a leading end of the cable.

8. The process of claim 7 wherein the step of centering the coil with the axially retractable support includes spacing the front face of the coil a precise length from a front wall of the mold cavity for controlling the thickness of the uniform uninterrupted front wall immediately forward the coil.

9. The process of claim 8 wherein the step of supporting the cable within the mold cavity includes maintaining the precise spacing and axial alignment of the coil with respect to a leading end of the cable while performing the molding step for providing an electromagnetic relationship of the coil and cable which is repeatable and rigidly maintained.

10. The process of claim 9 wherein the injection molding step includes injecting moldable material into the cavity of the mold to precisely ensconce the coil and the portion of the cable including both the exterior and center void of the coil, leads and the portion of the cable.

11. The process of claim 9 wherein the step of injecting moldable material into the cavity includes retracting both the coil support and the cable support after the moldable material has been injected into the mold cavity.

12. The process of claim 10 wherein the injection molding step further includes injecting a moldable material adjacent the coil and cable supports for filling in the area heretofore occupied by said plural supports.

13. The process of claim 11 further including the step of allowing the injecting moldable material to set and removing the thus formed transducer from the mold as an integrated unit.

14. The process of claim 3 wherein the step of connecting the leads of the coil to conductors of the cable includes the step of providing a cable having at least one outer conductor surrounding at least one insulator carrying at least one center conductor and stripping an end of said cable in a step like fashion to expose a portion of the center conductor, the insulator and the outer conductor.

15. The process of claim 14 wherein said connecting step further includes the step of forming a front and rear pair of ferrules with the front ferrule having a bore with a diameter substantially matching the diameter of the center conductor and the rear ferrule having a bore with a diameter substantially matching a diameter of the outer conductor.

16. The process of claim 15 wherein the connecting step further includes attaching said front ferrule to the center conductor and the rear ferrule to the outer conductor of the stripped end of the cable.

17. The process of claim 16 wherein connecting the leads of the coil to conductors of the cable further includes connecting one lead to the front ferrule and the other lead to the rear ferrule.

18. The process of claim 17 wherein the injection molding step includes axially aligning the coil along a long axis of the transducer and spacing the coil away from the stripped end of the cable at a known predetermined repeatable distance.

19. The process of claim 18 wherein the step axially aligning the coil along the long axis of the transducer includes the step of centering the coil within a mold cavity with an axially retractable support being received within the center void of the coil.

20. The process of claim 19 wherein the injection molding step further includes supporting the cable in the mold cavity with at least one radially retractable support.

21. The process of claim 20 wherein the injection molding step further includes injecting moldable material into the cavity of the mold to precisely ensconce the coil, the front and rear ferrules and the portion of the cable wherein the front and rear ferrules and coil are linearly aligned along the long axis of the transducer.

22. A method for making a transducer, the steps including:
coupling a coil having a center void to conductors of a cable;
orienting the coil and at least a portion of the cable within a mold cavity with at least one retractable support;
injection molding an encapsulation of material over an entire exterior of the coil, within and completely through the center void of the coil and over a portion of the cable defining a unitary mass ensconcing both the exterior and center void of the coil, and the portion of the cable.

23. A method for making a transducer, the steps including:
attaching a coil having a center void to conductors of a cable;
centering the coil within a mold cavity with at least one coil support;
supporting the cable within the mold cavity with at least one cable support;
injecting moldable material into the cavity of the mold to precisely ensconce both the center void and an exterior of the coil and a portion of the conductors for defining a mass totally enveloping the coil;
retracting the coil support and the cable support after the moldable material has been injected into the mold cavity;
injecting more moldable material adjacent the supports for filling in the areas heretofore occupied by at least the one coil and cable support and for filing in the center void of the coil so that moldable material extends completely therethrough;
allowing the moldable material to set;
removing the thus formed transducer from the mold as an integrated unit.

24. The method claim 23 wherein the step of supporting the coil further includes centering the coil within the mold cavity with an axially retractable support.

25. The method of claim 24 wherein the step of supporting the cable in the mold cavity includes the step of supporting the cable with at least one radially retractable support.

26. The method of claim 25 further including the step of preheating the mold cavity prior to injecting the moldable material therein.

27. The method of claim 26 further including the step of injecting the moldable material at a lower pressure and a low velocity to maintain the integrity of the coil, provide a good migration pattern of the moldable material in the cavity and to form a dense, sealed transducer.

28. The method of claim 27 further including the step of providing a bonding agent to the moldable material for enhancing the bond between the cable and the moldable material once set.

29. A method for making a transducer, comprising the steps of:
providing a coil having a center void, a front face, a rear face and at least a first lead and a second lead extending from the coil;
providing a cable having at least one outer conductor surrounding at least one insulator carrying at least one center conductor;
connecting the leads of the coil to the conductors of the cable;
supporting and centering the coil and cable assembly within a mold cavity with at least one retractable support;
orienting the cable to extend out from the mold cavity;
injecting moldable material into the cavity of the mold to precisely ensconce the coil and cable assembly by molding an encapsulation of moldable material over the leads of the coil, over a portion of the conductors of the cable, over the entire exterior of the coil including both the front and rear faces and within the center void of the coil;
retracting at least the one retractable support so that the moldable material will flow into the areas heretofore occupied by at least the one retractable support for ensconcing both the entire exterior of the coil and the center void of the coil such that moldable material extends completely through the center void, and covers the leads and the portion of the conductors of the cable.

* * * * *